United States Patent
Wu (10) Patent No.: US 9,642,152 B2
(45) Date of Patent: May 2, 2017

(54) RESOURCE ALLOCATION METHOD AND BASE STATION

(71) Applicant: Comba Telecom Systems (China) Ltd., Guangzhou (CN)

(72) Inventor: Hanguang Wu, Guangzhou (CN)

(73) Assignee: Comba Telecom Systems (China) Ltd (CN)

( * ) Notice: Subject to any disclaimer, the term of this patent is extended or adjusted under 35 U.S.C. 154(b) by 120 days.

(21) Appl. No.: 14/420,782

(22) PCT Filed: Aug. 8, 2013

(86) PCT No.: PCT/CN2013/081098
§ 371 (c)(1),
(2) Date: Feb. 10, 2015

(87) PCT Pub. No.: WO2014/026566
PCT Pub. Date: Feb. 20, 2014

(65) Prior Publication Data
US 2015/0264698 A1    Sep. 17, 2015

(30) Foreign Application Priority Data
Aug. 15, 2012 (CN) .......................... 2012 1 0290637

(51) Int. Cl.
*H04W 4/00* (2009.01)
*H04W 72/10* (2009.01)
(Continued)

(52) U.S. Cl.
CPC ......... *H04W 72/10* (2013.01); *H04W 72/087* (2013.01); *H04W 72/046* (2013.01)

(58) Field of Classification Search
CPC ...... H04W 72/04; H04W 88/08; H04W 76/00
See application file for complete search history.

(56) References Cited

U.S. PATENT DOCUMENTS

| 2005/0237989 A1* | 10/2005 | Ahn ............... H04J 11/0056 370/343 |
| 2007/0099647 A1* | 5/2007 | Lee ............... H04W 52/367 455/522 |

(Continued)

FOREIGN PATENT DOCUMENTS

| CN | 1964548 A | 5/2007 |
| CN | 101552990 A | 10/2009 |

(Continued)

OTHER PUBLICATIONS

Supplementary European Search Report for Application No. EP13829823 dated Apr. 22, 2016.

(Continued)

*Primary Examiner* — Siren Wei
(74) *Attorney, Agent, or Firm* — Lerner, David, Littenberg, Krumholz & Mentlik, LLP (57) ABSTRACT

A resource allocation method and base station. The resource allocation method comprises: within a current scheduling period, determining priorities of users in a cell for subcarriers in available frequency resources, and among the available frequency resources of the cell, allocating a corresponding available frequency resource for each user in the cell according to the priorities of all users for the subcarriers, so that the frequency resources that can be used by the edge users cover all available frequency ranges of the cell. Therefore, when frequency selectivity fading occurs in the channel, a decline in communication quality caused by allocating carrier resources for the edge users in the limited frequency resources is avoided, the probability that the edge users use deeply fading frequency resources is reduced, and interruption in the communication process is decreased, thereby improving system throughput.

8 Claims, 4 Drawing Sheets

(51) Int. Cl.
*H04W 72/08* (2009.01)
*H04W 72/04* (2009.01)

(56) References Cited

U.S. PATENT DOCUMENTS

| | | | |
|---|---|---|---|
| 2007/0142067 A1* | 6/2007 | Cheng | H04L 5/0007 |
| | | | 455/512 |
| 2009/0291691 A1* | 11/2009 | Jeong | H04W 72/048 |
| | | | 455/450 |
| 2010/0182972 A1* | 7/2010 | Katayama | H04W 72/048 |
| | | | 370/329 |
| 2010/0278135 A1* | 11/2010 | Inaida | H04L 5/0007 |
| | | | 370/329 |
| 2011/0081865 A1 | 4/2011 | Xiao et al. | |
| 2012/0008489 A1 | 1/2012 | Higuchi et al. | |
| 2012/0057478 A1 | 3/2012 | Brannstrom et al. | |

FOREIGN PATENT DOCUMENTS

| | | |
|---|---|---|
| CN | 101801091 A | 8/2010 |
| CN | 102118759 A | 7/2011 |
| CN | 102204310 A | 9/2011 |
| EP | 2701419 A2 | 2/2014 |

OTHER PUBLICATIONS

International Search Report for Application No. PCT/CN2013/081098 dated Nov. 14, 2013.

\* cited by examiner

RESOURCE ALLOCATION METHOD AND BASE STATION

CROSS-REFERENCE TO RELATED APPLICATIONS

The present application is a national phase entry under 35 U.S.C. §371 of International Application No. PCT/CN2013/081098, filed Aug. 8, 2013, which claims priority to Chinese Application No. 201210290637.X filed with the Chinese Patent Office on Aug. 15, 2012, all of which are hereby incorporated herein by reference.

FIELD OF THE INVENTION

The present invention relates to the field of wireless communication technologies, and in particular to a resource allocation method and a base station.

DESCRIPTION OF THE PRIOR ART

A cellular mobile communication system modulated through orthogonal frequency division multiplexing (OFDM) refers to a cellular mobile communication system through which a user uses multiple orthogonal subcarriers for data transmission. In said system, interference among users in a cell theoretically does not exist as the subcarriers used by different users in the same cell are mutually orthogonal. To improve the spectrum efficiency, however, users in different cells may use the same subcarriers for data transmission, which consequently cause relatively high co-channel interference among cells. To an OFDM modulation-based cellular mobile communication system, therefore, inter-cell interference becomes its major interference.

In the industry, the following two methods are usually employed to reduce inter-cell interference.

The first method: using the Fractional Frequency Reuse (FFR) technique to reduce inter-cell interference. The working principle is: when N−1 cells form a cell group, and when they are neighbor cells to each other and share all frequency resources of the system, the system divides all frequency resources into N groups of non-overlapping frequency bands, the center user in the N−1 cells use the $1^{st}$ frequency band group of the N frequency band groups, and the edge users in the N−1 cells use the remaining N−1 frequency band groups. Moreover, the edge users in the N−1 cells use different frequency band groups, and N is a positive integer greater than 1.

Figure 1:
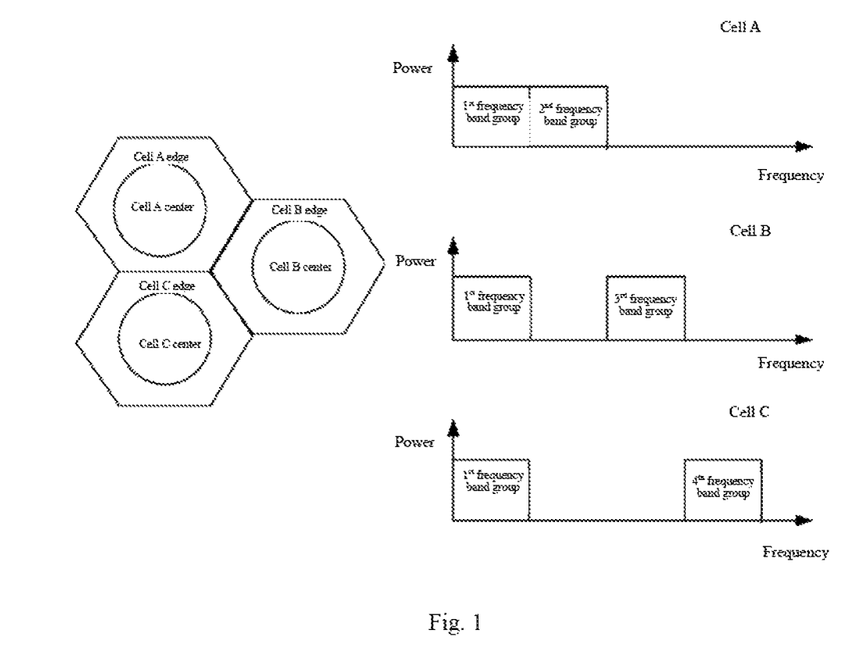
FIG. 1 illustrates the working principle of the FFR technique according to the prior art.

Assume that 3 cells, Cell A, Cell B and Cell C, form a cell group, and they are neighbor cells to each other and share all frequency resources of the system, then the working principle of the FFR technique is shown in FIG. 1: the system divides all frequency resources into 4 frequency band groups, for the cell center users, the system assigns the constant $1^{st}$ frequency band group (at this moment, the system's frequency reuse factor is 1), namely all center users of Cell A, Cell B and Cell C can use this $1^{st}$ frequency band group; on the other hand, edge users of Cell A use the $2^{nd}$ frequency band group, edge users of Cell B use the $3^{rd}$ frequency band group, and edge users of Cell C use the $4^{th}$ frequency band group (at this moment, the system's frequency reuse factor is 3). It can be seen from FIG. 1 that since the frequency bands used by edge users in neighbor cells are mutually orthogonal, and the transmission power of the neighbor cells on the frequency bands used by their own cell edge users is zero, the goal to reduce inter-cell interference can be achieved.

The second method: using the Soft Frequency Reuse (SFR) technique to reduce inter-cell interference. The working principle is: when N cells form a cell group, and when they are neighbor cells to each other and share all frequency resources of the system, the system divides all frequency resources into N groups of non-overlapping frequency bands, wherein the $1^{st}$ group allows the transmission of relatively high power and is referred to as primary subcarrier frequency band, the remaining N−1 groups only allow the transmission of relatively low power and are referred to as auxiliary subcarrier frequency bands. The frequency bands occupied by primary subcarriers of neighbor cells are mutually orthogonal, and the frequency bands occupied by auxiliary subcarriers of neighbor cells may overlap. For any cell in the cell group, the center user of the cell may use the entire frequency band of the system, while the cell edge users may only use primary subcarriers in the primary subcarrier frequency band.

Figure 2:
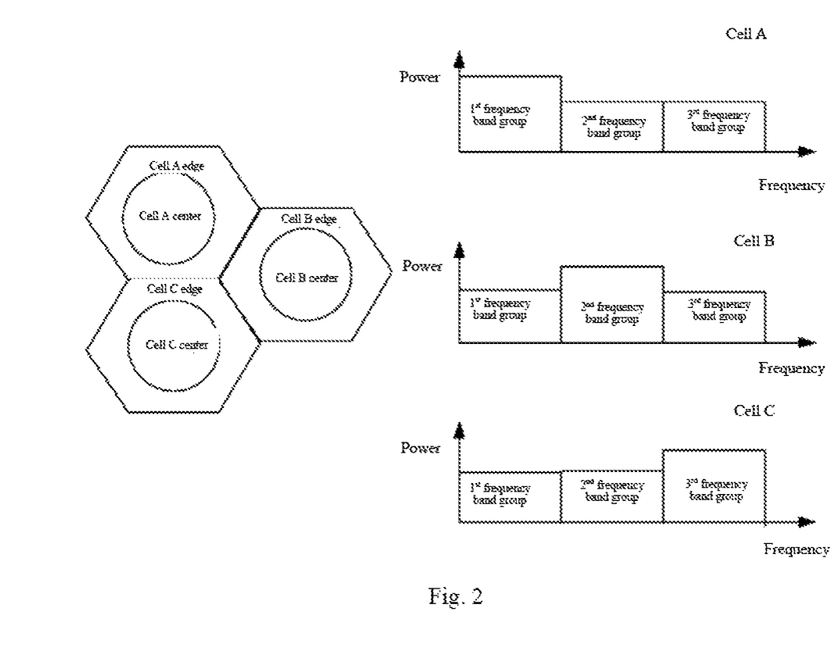
FIG. 2 illustrates the working principle of the SFR technique according to the prior art.

Further with the cell group formed by the above Cell A, Cell B and Cell C as an example, the working principle of the SFR technique is shown in FIG. 2. The system divides all frequency resources into 3 groups of frequency bands, and the frequency resources that may be used by users in Cell A, Cell B and Cell C are as follows, respectively:

For Cell A: its edge users may only use the $1^{st}$ frequency band group, and the transmission power of this group is relatively high, which is the primary subcarrier frequency band; its center users may use the entire frequency band of the system, i.e. the $1^{st}$ frequency band group occupied by the primary subcarrier, and the $2^{nd}$ frequency band group and $3^{rd}$ frequency band group occupied by the auxiliary subcarrier.

For Cell B: its edge users may only use the $2^{nd}$ frequency band group, and the transmission power of this group is relatively high, which is the primary subcarrier frequency band; its center users may use the entire frequency band of the system, i.e. the $2^{nd}$ frequency band group occupied by the primary subcarrier, and the $1^{st}$ frequency band group and $3^{rd}$ frequency band group occupied by the auxiliary subcarrier.

For Cell C: its edge users may only use the $3^{rd}$ frequency band group, and the transmission power of this group is relatively high, which is the primary subcarrier frequency band; its center users may use the entire frequency band of the system, i.e. the $3^{rd}$ frequency band group occupied by the primary subcarrier, and the $1^{st}$ frequency band group and $2^{nd}$ frequency band group occupied by the auxiliary subcarrier.

It can be seen from FIG. 2 that since the primary subcarriers that can be used by cell edge users by neighbor cells are different, edge users located at cell edges may use different primary subcarriers for data transmission, thereby eliminating interference among cell edge users; as transmission powers of different users may be controlled, at the same time, if the center user located at the cell center is relatively close to the base station, it can use relatively low transmission power. As a result, it can further reduce the interference of a cell center user on cell edge users of neighbor cells of said cell.

Although the above FFR technique and SFR technique reduce inter-cell interference, it is possible that when a frequency-selective channel environment is considered, the priority that an edge user uses frequency resources allocated by the system to a center user is higher than the use of frequency resources allocated thereto by the system. Since the above prior art limits frequency resources that can be used by edge users, the edge users may only use frequency resources allocated thereto by the system when a frequency-selective channel environment is considered. If severe frequency-selective fading occurs in the frequency resources, it is possible to interrupt the communication process and further decrease the system throughput.

SUMMARY OF THE INVENTION

Embodiments of the present invention provide a resource allocation method and abase station for solving the problem of lowered system throughput as a result of limitations to the frequency resources used by edge users in an OFDM system.

A resource allocation method, comprising:

Determining the priority of each user with respect to each subcarrier in the available frequency resources of the present cell during the current scheduling period;

With respect to any unallocated subcarrier in the available frequency resources, sequentially executing the following operations:

Determining the user with the highest priority with respect to the subcarrier;

When the user with the highest priority has not been allocated with sufficient carrier resources, allocating the subcarrier to the user with the highest priority, otherwise when other users with priority are present with respect to the subcarrier, allocating the subcarrier to said other users with priority.

A base station, comprising:

A priority determination module for determining the priority of each user with respect to each subcarrier in the available frequency resources of the present cell during the current scheduling period;

A resource allocation module for, with respect to any unallocated subcarrier in the available frequency resources, sequentially executing the following operations: determining the user with the highest priority with respect to the subcarrier; when the user with the highest priority has not been allocated with sufficient carrier resources, allocating the subcarrier to the user with the highest priority, otherwise when other users with priority are present with respect to the subcarrier, allocating the subcarrier to said other users with priority.

In the solution according to the embodiments of the present invention, a base station may allocate carrier resources for all users, including edge users, according to priority in all available frequency bands of the present cell, such that the frequency resources that can be used by edge users are all available frequency bands of the present cell, avoiding the problem that, when frequency-selective fading occurs in a channel, the communication quality deteriorates as a result of carrier resource allocation to edge users within limited frequency resources, lowering the possibility that edge users use frequency resources having deep fading, reducing interruption to the communication process and consequently improving the system throughput.

DETAILED DESCRIPTION OF SPECIFIC EMBODIMENTS

The solution according to the present invention will be described in detail with reference to specific embodiments.

Example 1

Figure 3:
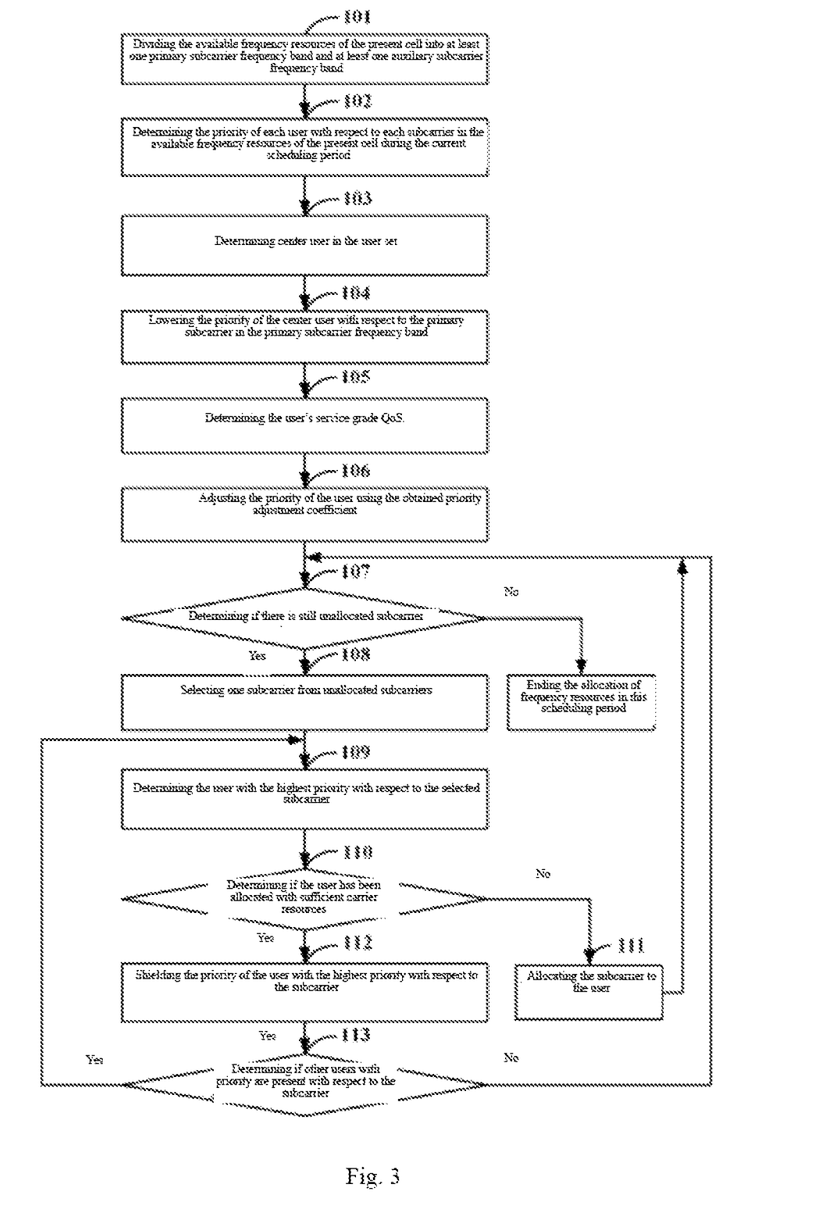
FIG. 3 is a flow chart of the resource allocation method in Example 1 according to the present invention.

As shown in FIG. 3, which is a flow chart of the resource allocation method in Example 1 according to the present invention, the resource allocation method specifically comprises the following steps:

Step 101: the base station divides the available frequency resources of the present cell into at least one primary subcarrier frequency band and at least one auxiliary subcarrier frequency band, wherein the transmission power of any primary subcarrier frequency band is higher than the transmission power of any auxiliary subcarrier frequency band, and the primary subcarrier frequency bands divided between neighbor cells are mutually orthogonal.

Said primary subcarrier frequency band comprises one or more primary subcarriers, said auxiliary subcarrier frequency band comprises one or more auxiliary subcarriers, and said primary subcarriers and auxiliary subcarriers may be collectively referred to as subcarriers.

Said primary subcarrier frequency band may be either continuous or discrete. Said auxiliary subcarrier frequency band may be either continuous or discrete.

In the step 101, the number of primary subcarriers may be set to be identical, or to be different, for all cells of the cell group.

It should be noted that the step 101 is a preferred step in Example 1, and the transmission power of the primary subcarrier frequency band being higher than the transmission power of the auxiliary subcarrier frequency band is to reduce co-channel interference of users using auxiliary subcarrier frequency bands in a neighbor cell on users using primary subcarrier frequency bands in the present cell.

Step 102: the base station determines the priority of each user with respect to each subcarrier in the available frequency resources of the present cell during the current scheduling period.

In the step 102, the base station first determines the set of users in need of service in the present cell, and then determines the priority that each user in the user set has with respect to each subcarrier or subcarrier block in the available frequency resources during the current scheduling period, said subcarrier block comprising a plurality of subcarriers.

Specifically, the base station may use an algorithm, such as the Proportional Fair (PF) algorithm, the Modified PF algorithm, the Largest Weighted Delay First (LWDF) algorithm, the Modified Largest Weighted Delay First (M-LWDF) algorithm, etc., to determine the priority that a user has with respect to each subcarrier or subcarrier block in the available frequency resources of the present cell during a scheduling period. With the PF algorithm as an example, the method to determine the priority that a user has with respect to each subcarrier or subcarrier block in the available frequency resources will be described below.

During the $t^{th}$ scheduling period, the priority $P_k(i, t)$ that the $k^{th}$ user in the user set of the present cell uses the $i^{th}$ subcarrier or subcarrier block as determined by the base station is:

$$P_k(i,t)=r_k(i,t)/R_k(t) \tag{1}$$

Wherein, $r_k(i, t)$ represents the instantaneous speed that the $k^{th}$ user may obtain at the $i^{th}$ subcarrier or subcarrier block during the $t^{th}$ scheduling period, $R_k(t)$ represents the long-term average speed that the $k^{th}$ user obtains as of the $t^{th}$ scheduling period, $r_k(i, t)$ is a real number that is greater than or equal to 0, $R_k(t)$ is a real number that is greater than 0, k is a positive integer that is greater than or equal to 1, and t is a positive integer that is greater than or equal to 1.

In the above equation (1), $R_k(t)$ may be obtained using the following equation (2):

$$R_k(t)=(1-1/T_w)*R_k(t-1)+(1/T_w)*r_k(i,t) \qquad (2)$$

Wherein, $T_w$ is the time window for statistics, which may be set based on empirical values, for example, it may be set to 10 s.

Step 103: the base station determines center user in the user set.

Specifically, whether a user is a center user can be determined using the following two methods:

The First Method:

Step I: the base station receives an estimated value of the receiving power for the dedicated reference signal of the present cell as reported by the user.

Step II: the base station determines if the estimated value of receiving power reported by the user is greater than a preset threshold value of reference signal power. If yes, the user is determined to be a center user.

The Second Method:

Step I: receiving the set of ratios of the present cell's path loss to the path losses of all neighbor cells as reported by the user.

Specifically, in the down transmission process, on one hand, the user receives the dedicated reference signal of the present cell and reference signals of the neighbor cells, and performs power estimation on them to obtain estimated values of receiving powers of the dedicated reference signal of the present cell and reference signals of the neighbor cells; on the other hand, the user obtains transmission powers of the dedicated reference signal of the present cell and reference signals of the neighbor cells from the broadcast information of the present cell and the broadcast information of the neighbor cells, respectively.

The user calculates the difference between the transmission power of the dedicated reference signal of the present cell and the estimated value of the dedicated reference signal of the present cell, and then obtains the value of path loss of the present cell from the base station to the user; the user calculates the difference between the transmission power of the dedicated reference signal of each neighbor cell and the estimated value of the dedicated reference signal of each neighbor cell, and then obtains the value of path loss of each neighbor cell from the base station to the user.

The user compares the value of path loss of the present cell from the base station to the user with the value of path loss of each neighbor cell from the base station to the user, respectively, obtains the set of ratios of the present cell's path loss to the path losses of all neighbor cells, and reports the relatively high ratios in the obtained set to the base station.

Step II: if the set of ratios reported by the user has a ratio greater than a preset threshold value, the user is determined to be a center user.

The preset threshold value may be preset based on empirical values.

Of course, other methods to determine a user to be a center user are not excluded in the step 103. For example: whether a user is determined to be a center user is based on the position information of the user in the present cell. If the user is at a position inside the designated cell center, then the user is determined to be a center user. In addition to the above methods, there are many kinds of methods to determine a user to be a center user according to the prior art, which will not be described herein.

Step 104: the base station lowers the priority of the center user with respect to the primary subcarrier in the primary subcarrier frequency band.

Specifically, the base station may lower the priority of the center user by multiplying the determined priority of the center user for the primary subcarrier by a coefficient that is greater than 0 and smaller than 1, or may obtain a lowered priority by directly deducting a specific value from the determined priority of the center user for the primary subcarrier.

It should be noted that the step 103 and the step 104 are preferred solutions in Example 1, the goal is to increase the opportunities that edge users obtain primary subcarrier resources of the present cell. Since the primary subcarrier resources have relatively high transmission power and are orthogonal to primary subcarriers of neighbor cells, the interference of users in neighbor cells on the edge users can be reduced.

Step 105: the base station determines the user's service grade QoS.

Specifically, the user's service grade can be determined according to the user's current load; higher user load indicates that it requires higher data transmission rate and has higher requirements for time delay, and the determined QoS is higher for the user.

Step 106: based on the preset corresponding relationship between QoS and priority adjustment coefficient, the base station obtains a priority adjustment coefficient corresponding to the determined QoS, and adjusts the priority of the user using the obtained priority adjustment coefficient.

In the step 106, the higher QoS is, the higher the obtained priority is after the priority adjustment is performed on the user, such that it has the priority to be allocated with subcarrier resources during resource allocation to meet its demand.

Figure 4:
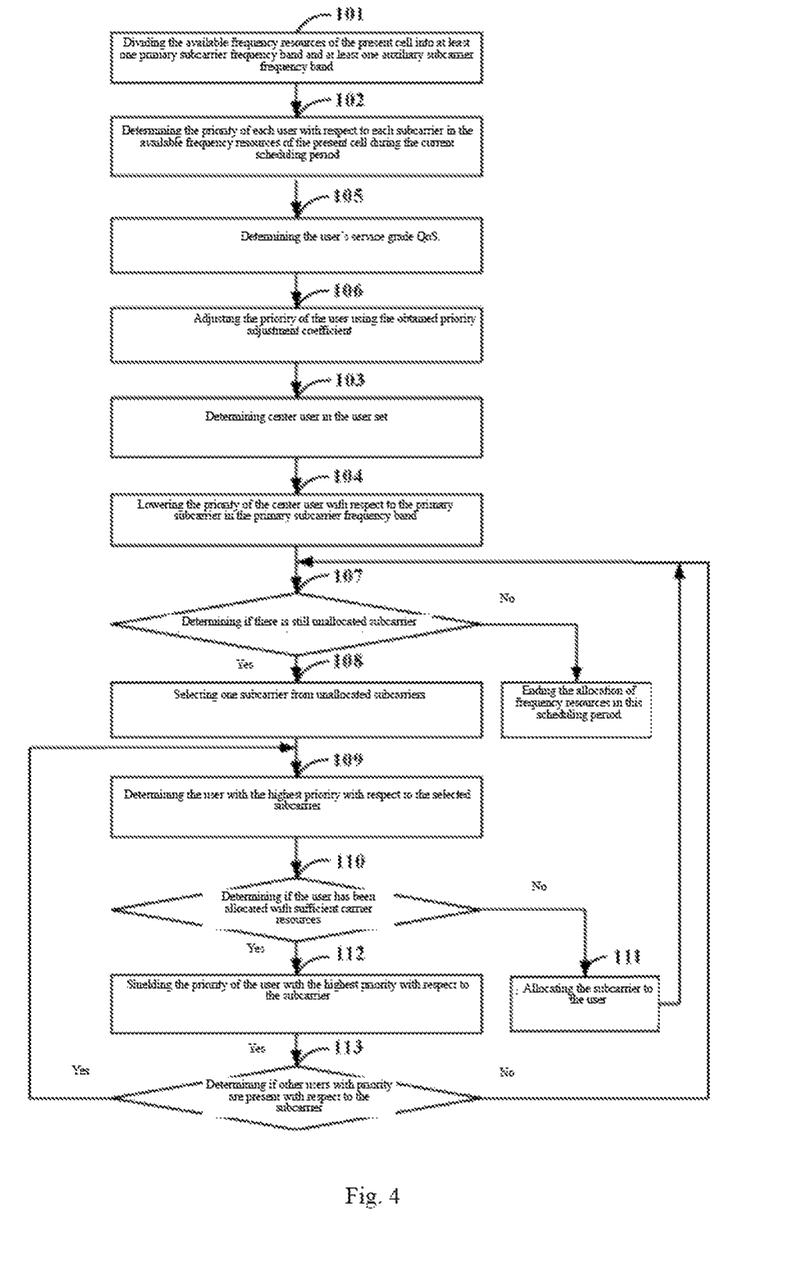
FIG. 4 is another flow chart of the resource allocation method in Example 1 according to the present invention.

It should be noted that the step 105 and the step 106 are preferred solutions in Example 1, the step 105 and the step 106 may be carried out after the step 104, and when the step 106 is carried out, the step 107 is carried out; alternatively, the step 105 and the step 106 may be carried out after the step 102, subsequently the step 103 and the step 104 are carried out, and when the step 104 is carried out, the step 107 is carried out. The flow chart of the resource allocation method at this time is shown in FIG. 4.

Step 107: the base station determines if there is still unallocated subcarrier in the available frequency resources, if the determination result is yes, the step 108 is carried out; if the determination result is no, then the allocation of frequency resources in this scheduling period is ended.

Step 108: the base station selects one subcarrier from unallocated subcarriers.

Step 109: the base station determines the user with the highest priority with respect to the selected subcarrier.

Step 110: the base station determines if the user with the highest priority has been allocated with sufficient carrier resources, if yes, then the step 112 is carried out; if no, then the step 111 is carried out.

Step 111: the base station allocates the subcarrier to the user and jumps to the step 107.

Step 112: the base station shields the priority of the user with the highest priority with respect to the subcarrier, and carries out the step 113.

In the step 112, the priority of the user with the highest priority with respect to the subcarrier is shielded such that said shielded user does not participate in the allocation of the subcarrier resource when a user with the highest priority with respect to the subcarrier is determined again.

Preferably, in the step 112, as the user with the highest priority has been allocated with sufficient carrier resources and there is no need to further allocate carrier resources to it, the base station may also shield the priority of the user with respect to other unallocated subcarrier resources in the system at this moment, thereby reducing the number of determination by the base station when carrying out the allocation operation and improving the subsequent allocation efficiency of subcarrier resources.

Step 113: the base station determines if other users with priority are present with respect to the subcarrier, if yes, then jump to the step 109, if no, then jump to the step 107.

A summary of the above step 107 through the step 113 is that, with respect to any unallocated subcarrier in the available frequency resources, the base station sequentially executes the following operations:

Determining the user with the highest priority with respect to the subcarrier;

When the user with the highest priority has not been allocated with sufficient carrier resources, allocating the subcarrier to the user, otherwise when other users with priority are present with respect to the subcarrier, allocating the subcarrier to said other users with priority.

The method to divide frequency resources in Example 1 of the present invention is the same as the method to divide frequency resources in the SFR technique according to the prior art; however, the specific use method is different. With a cell group formed by Cell A, Cell B and Cell C as an example, the working principle of the resource allocation method in Example 1 of the present invention will be described below with reference to FIG. 2.

In FIG. 2, the system divides all frequency resources into 3 groups of frequency bands, and the frequency resources that may be used by users in Cell A, Cell B and Cell C are as follows, respectively:

For Cell A: its edge users may use the entire frequency band of the system, i.e. the $1^{st}$ frequency band group occupied by the primary subcarrier with relatively high transmission power, and the 2nd frequency band group and $3^{rd}$ frequency band group occupied by the auxiliary subcarrier with relatively low transmission power; its center user may also use the entire frequency band of the system, i.e. the $1^{st}$ frequency band group occupied by the primary subcarrier, and the $2^{nd}$ frequency band group and $3^{rd}$ frequency band group occupied by the auxiliary subcarrier; however, the edge users have a higher priority to use the $1^{st}$ frequency band group than the center user does.

For Cell B: its edge users may use the entire frequency band of the system, i.e. the $2^{nd}$ frequency band group occupied by the primary subcarrier with relatively high transmission power, and the $1^{st}$ frequency band group and $3^{rd}$ frequency band group occupied by the auxiliary subcarrier with relatively low transmission power; its center user may also use the entire frequency band of the system, i.e. the $1^{st}$ frequency band group occupied by the primary subcarrier, and the $2^{nd}$ frequency band group and $3^{rd}$ frequency band group occupied by the auxiliary subcarrier; however, the edge users have a higher priority to use the $2^{nd}$ frequency band group than the center user does.

For Cell C: its edge users may use the entire frequency band of the system, i.e. the $3^{rd}$ frequency band group occupied by the primary subcarrier with relatively high transmission power, and the $1^{st}$ frequency band group and $2^{nd}$ frequency band group occupied by the auxiliary subcarrier with relatively low transmission power; its center user may also use the entire frequency band of the system, i.e. the $1^{st}$ frequency band group occupied by the primary subcarrier, and the $2^{nd}$ frequency band group and $3^{rd}$ frequency band group occupied by the auxiliary subcarrier; however, the edge users have a higher priority to use the $3^{rd}$ frequency band group than the center user does.

To clearly describe the resource allocation method in Example 1 of the present invention, the above Cell A will be used as an example below to specifically describe the resource allocation method in Example 1 of the present invention. Assume that Cell A has available primary subcarrier resources A1 and A2, auxiliary subcarrier resources B1, B2, B3 and B4, and the user set in need of service as determined by the base station is users U1, U2 and U3. The priority of each of the users U1, U2 and U3 with respect to each subcarrier A1, A2, B1, B2, B3 and B4 in the available frequency resources of the present cell during the current scheduling period as determined by the base station is shown in Table 1 (in Table 1, higher values indicate higher priorities), and the number of subcarriers required by the user U1 is 1, the number of subcarriers required by the user U2 is 2, and the number of subcarriers required by the user U3 is 3.

TABLE 1

|    | A1 | A2 | B1 | B2 | B3 | B4 |
|----|----|----|----|----|----|----|
| U1 | 5  | 4  | 1  | 3  | 6  | 3  |
| U2 | 3  | 3  | 5  | 5  | 4  | 5  |
| U3 | 4  | 2  | 3  | 6  | 2  | 6  |

Assume that the base station determines that the user U1 is a center user, then based on Table 1, the base station lowers the priority of the user U1 with respect to each primary subcarrier, and the obtained priorities of the users U1, U2 and U3 with respect to each subcarrier are shown in Table 2:

TABLE 2

|    | A1 | A2 | B1 | B2 | B3 | B4 |
|----|----|----|----|----|----|----|
| U1 | 4  | 2  | 1  | 3  | 6  | 3  |
| U2 | 3  | 3  | 5  | 5  | 4  | 5  |
| U3 | 4  | 2  | 3  | 6  | 2  | 6  |

Assume that QoS of the user U2 determined by the base station is the highest, which is 3; QoS of the user U1 is the second highest, which is 2; and QoS of the user U3 is the lowest, which is 1; then based on the preset corresponding relationship between QoS and priority adjustment coefficient, the base station adjusts the priorities of the users U1, U2 and U3, and the obtained priorities of the users U1, U2 and U3 with respect to each subcarrier are shown in Table 3:

TABLE 3

|    | A1 | A2 | B1 | B2 | B3 | B4 |
|----|----|----|----|----|----|----|
| U1 | 4  | 2  | 1  | 3  | 6  | 3  |
| U2 | 4  | 4  | 6  | 6  | 5  | 6  |
| U3 | 3  | 1  | 2  | 5  | 1  | 5  |

As of now, the base station has determined the final priority of each user with respect to each subcarrier (shown in Table 3), and begins to perform allocation of the subcarrier resources for the users U1, U2 and U3:

Step 1: the base station determines that the available frequency resources has unallocated subcarriers A1, A2, B1, B2, B3 and B4.

Step 2: the base station selects the subcarrier A1.

Step 3: the base station determines that the user with the highest priority with respect to the subcarrier A1 is U1, and determines that U1 has not been allocated with sufficient subcarrier resources, therefore, it allocates the subcarrier A1 to U1.

Step 4: the base station determines that the available frequency resources further has other unallocated subcarriers A2, B1, B2, B3 and B4.

Step 5: the base station selects the subcarrier A2.

Step 6: the base station determines that the user with the highest priority with respect to the subcarrier A2 is U2, and determines that U2 has not been allocated with sufficient subcarrier resources, therefore, it allocates the subcarrier A2 to U2.

Step 7: the base station determines that the available frequency resources further has other unallocated subcarriers B1, B2, B3 and B4.

Step 8: the base station selects the subcarrier B1.

Step 9: the base station determines that the user with the highest priority with respect to the subcarrier B1 is U2, and determines that U2 has not been allocated with sufficient subcarrier resources, therefore, it allocates the subcarrier B1 to U2.

Step 10: the base station determines that the available frequency resources further has other unallocated subcarriers B2, B3 and B4.

Step 11: the base station selects the subcarrier B2.

Step 12: the base station determines that the user with the highest priority with respect to the subcarrier B2 is U2, and determines that U2 has been allocated with sufficient subcarrier resources, therefore, it shields the priority of the user U2 with respect to the subcarrier B2, and determines that other users with priority are present with respect to the subcarrier B2.

Step 13: the base station determines that the user with the highest priority with respect to the subcarrier B2 is U3, and determines that U3 has not been allocated with sufficient subcarrier resources, therefore, it allocates the subcarrier B2 to U3.

Step 14: the base station determines that the available frequency resources further has other unallocated subcarriers B3 and B4.

Step 15: the base station selects the subcarrier B3.

Step 16: the base station determines that the user with the highest priority with respect to the subcarrier B3 is U1, and determines that U1 has been allocated with sufficient subcarrier resources, therefore, it shields the priority of the user U1 with respect to the subcarrier B3, and determines that other users with priority are present with respect to the subcarrier B3.

Step 17: the base station determines that the user with the highest priority with respect to the subcarrier B3 is U2, and determines that U2 has been allocated with sufficient subcarrier resources, therefore, it shields the priority of the user U2 with respect to the subcarrier B3, and determines that other users with priority are present with respect to the subcarrier B3.

Step 18: the base station determines that the user with the highest priority with respect to the subcarrier B3 is U3, and determines that U3 has not been allocated with sufficient subcarrier resources, therefore, it allocates the subcarrier B3 to U3.

Step 19: the base station determines that the available frequency resources further has other unallocated subcarrier B4.

Step 20: the base station selects the subcarrier B4.

Step 21: the base station determines that the user with the highest priority with respect to the subcarrier B4 is U2, and determines that U2 has been allocated with sufficient subcarrier resources, therefore, it shields the priority of the user U2 with respect to the subcarrier B4, and determines that other users with priority are present with respect to the subcarrier B4.

Step 22: the base station determines that the user with the highest priority with respect to the subcarrier B4 is U3, and determines that U3 has not been allocated with sufficient subcarrier resources, therefore, it allocates the subcarrier B4 to U3.

Step 22: the base station determines that the available frequency resources does not have unallocated subcarriers and ends this resource allocation process.

In the above Example 1, the base station lowers the priority of the center user to use the primary subcarrier, which relatively increases the priority of the edge user to use the primary subcarrier, such that the edge user has greater opportunities to obtain the primary subcarrier. Since the primary subcarrier frequency bands in neighbor cells are mutually orthogonal, moreover, it can achieve the goal of reducing inter-cell interference; at the same time, since the base station allocates resources to the center user in the available frequency band resources of the present cell, the center user may use the primary subcarrier resources when primary subcarriers are not fully used by the edge users, thereby reducing the interference suffered by the center user; in addition, since the base station allocates priority for an edge user to use each subcarrier or subcarrier block in the available frequency resources of its cell during a scheduling period and allocates carrier resources to the edge user according to the priority, the frequency resources that may be used by the edge user is all available frequency resources of its cell, which avoids the problem that, when frequency-selective fading occurs in a channel, the communication quality deteriorates as a result of carrier resource allocation to edge users within limited frequency resources, lowers the possibility that edge users use frequency resources having deep fading, reduces interruption to the communication process and consequently improves the system throughput.

Example 2

Figure 5:
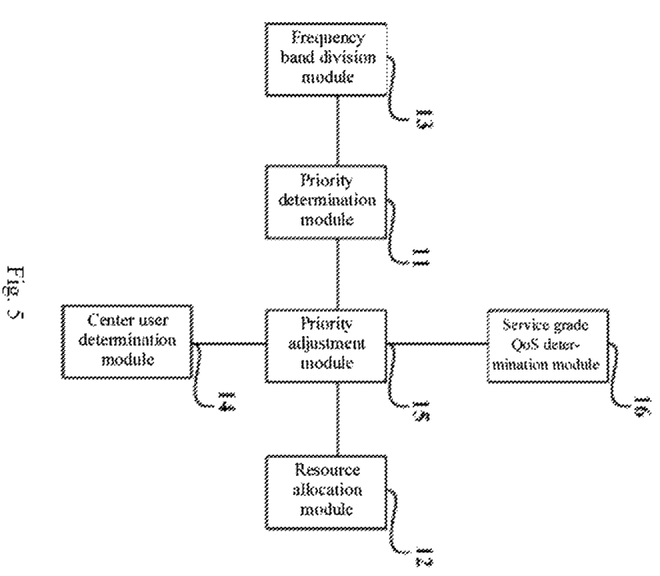
FIG. 5 illustrates the structure of the base station in Example 2 according to the present invention.

As shown in FIG. 5, which illustrates the structure of the base station in Example 2 according to the present invention, the base station comprises a priority determination module 11 and a resource allocation module 12, wherein:

The priority determination module 11 is used for determining the priority of each user with respect to each subcarrier in the available frequency resources of the present cell during the current scheduling period. See the step 102 in Example 1 for the specific determination method, which will not be described herein.

The resource allocation module 12 is used for, with respect to any unallocated subcarrier in the available frequency resources, sequentially executing the following operations: determining the user with the highest priority with respect to the subcarrier; when the user with the highest priority has not been allocated with sufficient carrier resources, allocating the subcarrier to the user with the highest priority, otherwise when other users with priority are present with respect to the subcarrier, allocating the subcarrier to said other users with priority. See the step 107 through the step 113 in Example 1 for the specific implementation process of the operations, which will not be described herein.

Preferably, the base station further comprises:

A frequency band division module 13 for dividing the available frequency resources of the present cell into at least one primary subcarrier frequency band and at least one auxiliary subcarrier frequency band, wherein the transmission power of any primary subcarrier frequency band is higher than the transmission power of any auxiliary subcarrier frequency band, and the primary subcarrier frequency bands divided between neighbor cells are mutually orthogonal.

A center user determination module 14 for determining center user in the present cell.

A priority adjustment module 15 for lowering the priority of the center user with respect to the primary subcarrier in the primary subcarrier frequency band.

Preferably, the base station further comprises:

A QoS determination module 16 for determining QoS for a user;

The priority adjustment module 15 is further used for, based on the preset corresponding relationship between QoS and priority adjustment coefficient, obtaining a priority adjustment coefficient corresponding to the QoS of the user, and adjusting the priority of the user using the obtained priority adjustment coefficient.

Preferably, the center user determination module 14 is specifically used for receiving an estimated value of the receiving power for the dedicated reference signal of the present cell as reported by the user, and if the estimated value of receiving power for the dedicated reference signal of the present cell is greater than a preset threshold value of reference signal power, then the user is determined to be a center user.

Preferably, the center user determination module 14 is specifically used for receiving the set of ratios of the present cell's path loss to the path losses of all neighbor cells as reported by the user, and if a ratio greater than a set threshold value exists in the set of ratios reported by the user, then the user is determined to be a center user.

Those skilled in the art should understand that examples of the present invention may be provided as methods, systems or computer program products. Therefore, the present invention may be in the form of full hardware examples, full software examples, or examples that combine software and hardware. In addition, the present invention may be in the form of a computer program product implemented on a computer usable storage medium (including but not limited to disk memory, CD-ROM, optical memory, etc.) that contains computer usable program codes.

The present invention is described with reference to flow charts and/or block diagrams of the methods, equipment (systems) and computer program products according to the examples of the present invention. It should be understood that each flow and/or block in the flow charts and/or block diagrams, as well as combinations of the flows and/or blocks in the flow charts and/or block diagrams, may be implemented through computer program commands. These computer program commands may be provided to a processor of a general computer, a dedicated computer, an embedded processing machine or other programmable data processing apparatuses to produce a machine, such that devices are produced via commands executed by the computer or other programmable data processing apparatuses for implementing functions designated in one flow or more flows in the flow chart and/or one block or more blocks in the block diagram.

These computer program commands may also be stored on a computer readable memory capable of guiding the computer or other programmable data processing apparatuses to operate in a specific manner such that the commands stored on said computer readable memory produce an article comprising a command device, and said command device implements functions designated in one flow or more flows in the flow chart and/or one block or more blocks in the block diagram.

These computer program commands may also be loaded to the computer or other programmable data processing apparatuses, such that a series of operating steps are executed on the computer or other programmable data processing apparatuses to produce processing that is implemented by the computer, and as a result, the commands executed on the computer or other programmable data processing apparatuses provide steps for implementing functions designated in one flow or more flows in the flow chart and/or one block or more blocks in the block diagram.

Although preferred examples of the present invention have been described, those skilled in the art may make additional variations and modifications to these examples once they learn the basic inventive concept. Therefore, the appended claims intend to be interpreted as encompassing the preferred examples and all variations and modifications falling into the scope of the present invention.

Apparently, those skilled in the art may make various changes and variations to the present invention without departing from the spirit and scope of the present invention. In such a way, if these changes and variations to the present invention fall into the scope of the claims of the present invention and equivalent technologies thereof, the present invention also intends to encompass these changes and variations.

The invention claimed is:

1. A resource allocation method, characterized in that the method comprises:

determining, by one or more processors, available frequency resources within a present cell wherein the available frequency resources comprise one or more subcarrier frequency resources;

dividing, by the one or more processors, the one or more subcarrier frequency resources into at least one primary subcarrier frequency band and at least one auxiliary subcarrier frequency band, wherein transmission power of each primary subcarrier frequency band is higher than transmission power of each auxiliary subcarrier frequency band;

determining, by the one or more processors, for each of a plurality of users, a priority for each one of the one or more subcarrier frequency resources during a current scheduling period;

determining, by the one or more processors, for each user, whether the user is a center user, and for each center user, lowering the priority of the center user with respect to the at least one primary subcarrier frequency band;

determining a service grade QoS for each user; and for each user, obtaining a preset priority adjustment coefficient corresponding to the determined QoS, and adjusting each priority for each one of the one or more subcarrier frequency resources of the user using the obtained preset priority adjustment coefficient;

determining, by the one or more processors, unallocated subcarrier frequency resources in the one or more subcarrier frequency resources; and for each unallocated subcarrier frequency resource, sequentially executing, by the one or more processors:

determining a highest priority user with respect to the unallocated subcarrier frequency resource; and when the highest priority user has not been allocated with sufficient carrier resources, allocating the unallocated subcarrier frequency resource to the highest priority user, otherwise allocating the unallocated subcarrier frequency resource to next highest priority user who has not been allocated with sufficient carrier resources.

2. The method according to claim 1, wherein the primary subcarrier frequency bands divided between neighbor cells are mutually orthogonal.

3. The method according to claim 2, wherein determining whether the user is a center user further comprises:

receiving an estimated value of the receiving power for the dedicated reference signal of the present cell from the user; and determining the received estimated value of receiving power for the dedicated reference signal of the present cell is greater than a preset threshold value of reference signal power.

4. The method according to claim 2, wherein determining whether the user is a center user further comprises:

receiving a set of ratios of a path loss of the present cell to path losses of all neighboring cells from the user; and determining the set of ratios comprises one or more ratios greater than a set threshold value.

5. A base station, characterized in that the base station comprises:

one or more processors; and one or more computer-readable storage medium storing instructions, which when executed by the one or more processors, causes the one or more processors to:

determine available frequency resources within a present cell wherein the available frequency resources comprise one or more subcarrier frequency resources;

divide the one or more subcarrier frequency resources into at least one primary subcarrier frequency band and at least one auxiliary subcarrier frequency band, wherein transmission power of each primary subcarrier frequency band is higher than transmission power of each auxiliary subcarrier frequency band;

determine for each of a plurality of users, a priority for each one of the one or more subcarrier frequencies during a current scheduling period;

determine, for each user, whether the user is a center user, and for each center user, lowering the priority of the center user with respect to the at least one primary subcarrier frequency band;

determine a service grade QoS for each user; and for each user, obtain a preset priority adjustment coefficient corresponding to the determined QoS, and adjust each priority for each one of the one or more subcarrier frequency resources of the user using the obtained preset priority adjustment coefficient;

determining unallocated subcarrier frequency resources in the one or more subcarrier frequency resources; and for each unallocated subcarrier frequency resource, sequentially execute the following operations:

determine a highest priority user with respect with respect to the unallocated subcarrier frequency resource; and when the highest priority user has not been allocated with sufficient carrier resources, allocate the unallocated subcarrier frequency resource to the highest priority user, otherwise allocate the unallocated subcarrier frequency resource to the next highest priority user who has not been allocated with sufficient resources.

6. The base station according to claim 5, wherein the primary subcarrier frequency bands divided between neighbor cells are mutually orthogonal.

7. The base station according to claim 6, wherein the instructions for determining whether the user is a center user further cause the one or more processors to:

receive an estimated value of the receiving power for the dedicated reference signal of the present cell from the user; and determine if the estimated value of receiving power for the dedicated reference signal of the present cell is greater than a preset threshold value of reference signal power.

8. The base station according to claim 6, wherein the instructions for determining whether the user is a center user further cause the one or more processors to:

receive a set of ratios of a path loss of the present cell to the path losses of all neighboring cells from the user; and determining the set of ratios comprises one or more ratios greater than a set threshold value exists in the set of ratios.

* * * * *